United States Patent [19]

Wade

[11] Patent Number: 4,856,092
[45] Date of Patent: Aug. 8, 1989

[54] OPTICAL PULSE GENERATING ARRANGEMENTS

[75] Inventor: Christopher A. Wade, Southampton, England

[73] Assignee: Plessey Overseas Limited, Ilford, England

[21] Appl. No.: 800,879

[22] Filed: Nov. 22, 1985

[30] Foreign Application Priority Data

Nov. 24, 1984 [GB] United Kingdom ............... 8429755

[51] Int. Cl.⁴ .......................... G02F 1/21; G02F 2/02
[52] U.S. Cl. ..................................... 455/609; 455/608; 350/358
[58] Field of Search ................... 455/609, 608; 356/124.5, 349; 350/358; 370/4

[56] References Cited

U.S. PATENT DOCUMENTS 3,849,604 11/1974 Benes et al. ........................... 370/4
4,486,657 12/1984 Bush ..................................... 356/349
4,558,948 12/1985 Picard ................................... 356/349

FOREIGN PATENT DOCUMENTS 0183502 6/1986 European Pat. Off. ............ 356/349

Primary Examiner—Michael A. Masinick
Attorney, Agent, or Firm—Michael F. Oglo; Julian C. Renfro

[57] ABSTRACT

A differential delay optical coherent pulse generating arrangement, in which continuous wave light derived from a coherent light source is divided by beam splitting means into two optical paths, in which the light beam in one of said paths is delayed relative to the light beam in the other of said paths by differential delay means prior to the sequential selection of the light from the respective paths by optical switching means to produce two coherent pulses in predetermined time displaced relationship and in which a frequency difference may, if required, be produced between the frequencies of the two coherent pulses.

5 Claims, 1 Drawing Sheet

OPTICAL PULSE GENERATING ARRANGEMENTS

This invention relates to optical pulse generating arrangements and relates more specifically to differential delay coherent pulse generating arrangements suitable for use in differential delay heterodyne interferometers and to optical devices for incorporation in such differential delay optical coherent pulse generating arrangements.

According to one aspect of the present invention there is provided a differential delay optical coherent pulse generating arrangement in which in operation of the arranged continuous wave light derived from a coherent light source is divided by beam splitting means into two optical paths in which the light beam in one of said paths is delayed relative to the light beam in the other of said paths by differential delay means prior to the sequential selection of the light from the respective paths by optical switching means to produce two coherent pulses in predetermined time displaced relationship and in which a frequency difference may, if required, be produced between the frequencies of the two coherent pulses which may for example then be utilised in a heterodyne interferometer.

The delaying of one of the divided light beams relative to the other and the delay introduced by the sequential optical switching means serves to provide total coherence between the light content of the two coherent pulses, that is to say, the two time displaced output pulses are both derived from the same period of light from the coherent light source and consequently the latter may have a relatively short coherent length, thus enabling for example a semiconductor laser to be used instead of the less compact and less rugged gas laser.

The frequency difference between the two output pulses (e.g. 4200 MHz in an 80 MHz system) may be produced by means of a frequency shifting device introduced into either of the two light paths referred to above or alternatively, it may be introduced into the system following the optical switching means, in which case the frequency shifting device will be arranged to shift the frequencies of both time displaced pulses relative to one another to produce the requisite frequency differential.

In carrying out the above aspect of the present invention the optical paths are preferably optical fibres and the optical switching function and the frequency shifting function may be performed by means of a Bragg cell which receives the light beams from the respective paths and which is driven by two different signals so that the two light beams are alternatively deflected into a common output optical fibre as the Bragg cell is driven in turn by the two different frequencies.

In one contemplated application of the present invention to a heterodyne interferometer system the two time displaced coherent pulses of different frequencies produced by the pulse generating arrangement may be launched into a spliced sensing optical fibre. The light pulses reflected from consecutive partially reflecting splices equally spaced along the sensing fibre in dependence upon the time displacement between the coherent pulses interfere with one another and pass back through the aforesaid optical switching means without deflection of the pulses to heterodyning means (e.g. square law photo-detector) to produce an electrical beat frequency signal. The optical switching means may comprise a Bragg cell which is switched off to allow the reflected light pulses to pass to the heterodyning detector means without being deflected. Phase modulation of this beat signal will vary with changes in the lengths of the elements of the sensing fibre between adjacent splices. Thus by detecting and measuring the phase modulation of the beat signal by means of a phase detector changes in length of the optical fibre elements can be determined. Such changes in length of the fibre elements may for example be produced by acoustic signals impinging on the sensing fibre or by temperature or pressure changes etc. In this connection attention is hereby directed to our co-pending Patent Application No. 2126820 (F12973).

In another contemplated application of the invention, the time displaced pulses of different frequency derived from the optical pulse generating arrangement according to the present invention could be launched through a beam splitting arrangement into an interferometer hydrophone of the form fully described in our co-pending patent application No. 8207961.

According to another aspect of the present invention there is provided a differential delay optical pulse generating arrangement in which, in operation of the arrangement, the output from a continuous wave coherent light source is fed to a frequency shifting Bragg cell which is driven alternately by two different frequency signals to produce output pulses of different frequency for launching into an output optical fibre and which additionally serves to switch partially reflected optical pulses returned over said output optical fibre to light detecting means.

This second aspect of the present invention may be applied to a differential delay heterodyne interferometer requiring pairs of optical pulses to be generated having frequencies differing from one another by the desired heterodyne frequency. The utilisation of the Bragg cell both as frequency shifting means and optical switching means for the returned reflected light pulses enables the use of "lossy" beam splitting means for diverting returned reflected light pulses to heterodyning detection means to be avoided. In this connection attention is hereby directed to our co-pending Patent Application No. 2126820A.

By way of example the different aspects of the present invention will now be described with reference to the accompanying drawings in which.

Figure 1:
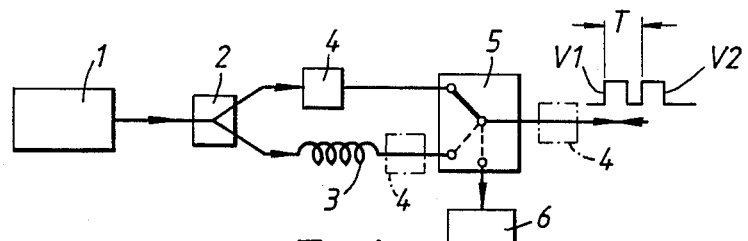
FIG. 1 shows one optical pulse generating arrangement according to the invention.

Referring to FIG. 1 of the drawings the light output from a semiconductor continuous wave coherent light source 1 is divided and directed along two optical fibre paths by means of a beam splitter 2. One of these optical fibre paths includes optical delay means such as a coiled optical fibre 3 for delaying the propagated light in the path concerned relative to the propagated light in the other path. The other optical fibre path includes frequency shifting means 4 (e.g Bragg cell) for producing a frequency shift in the propagated light. Optical switching means 5 is arranged for sequentially selecting the delayed non-frequency shifted light and the non-delayed frequency shifted light outputs from the respective optical paths. This sequential selection serves to produce time-displaced output pulses V1 and V2 of different frequencies. Because of the relative time delay T produced between the pulses V1 and V2 by the sequential switching action of the optical switching means 5 and as a result of the delay introduced by the delay means 3 the light content of the pulses V1 and V2 is derived from the same period of light from the light source 1 and consequently the light pulses V1 and V2 are totally coherent. This allows the choice of a more rugged and compact semiconductor laser light source 1 having a relatively short coherent length to be made instead of a gas laser light source.

As shown in dotted outline, the frequency shifting means 4 may alternatively be connected in the same optical fibre path as the optical delay means 3, or it may be connected on the output side of the optical switching means 5. In the latter case it will of course be necessary for the respective pulses to be frequency shifted by different amounts.

The coherent light pulses V1 and V2 may be utilised in heterodyne interferometers of the forms described in our co-pending Patent Applications Nos. 2126820A (F.12973) and 8207961 (F.12943) but in the first-mentioned patent application the time-displaced different frequency optical pulses V1 and V2 differing in frequency by the requisite heterodyne frequency will be partially reflected back to the optical switching means 5 by equally-spaced splices provided between consecutive optical fibre elements of an acoustic signal or other sensing fibre (not shown). These partially reflected pulses will be switched by the optical switching means 5 so as to impinge on light detector means 6, such as a square-law photo-diode, in order to produce a heterodyned electrical beat frequency signal. The phase modulation of the beat signal will vary with changes in length of the fibre elements between consecutive splices of the sensor fibre, due for example to the impingement of acoustic signals thereon, and may be suitably detected and measured.

Figure 2:
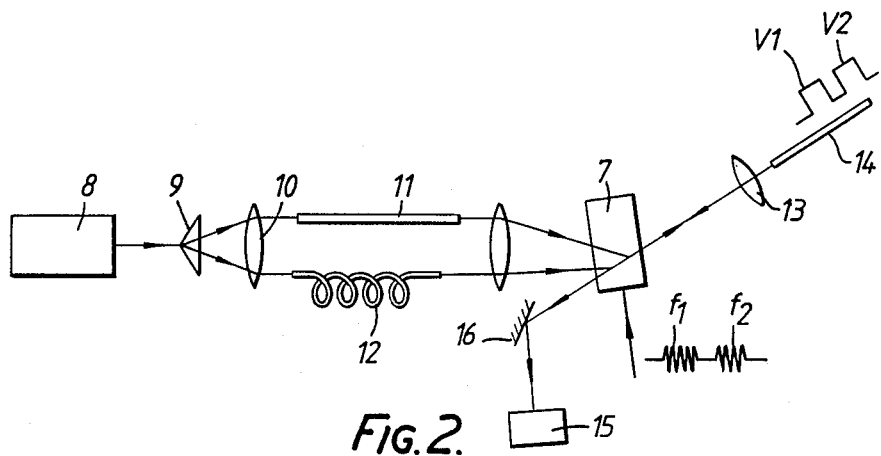
FIG. 2 shows a preferred specific form of the pulse generating arrangement of FIG. 1; and, FIG. 3 shows an alternative optical pulse generating arrangement.

Referring now to FIG. 2 of the drawings, this shows an arrangement in which the optical switching means and the frequency shifting means of the FIG. 1 arrangement are constituted by a single Bragg cell 7. Continuous wave light from a coherent light source 8 is divided and directed into two optical fibre paths by means of a beam splitting bi-prism 9 and convex lens 10. The respective paths may comprise a linear optical fibre 11 and a coiled optical fibre 12 which delays the light beams in the two paths relative to one another by time T. The light beams emerging from the respective paths are received by the Bragg cell 7. The Bragg cell is driven alternately by two signals of frequencies f1 and f2 whereby the Bragg cell produces output pulses V1 and V2 displaced from one another by time T. These pulses V1 and V2 are launched by a convex lens 13 into an output fibre 14. As before, the output pulses V1 and V2 are totally coherent and may be utilised in the heterodyne interferometers forming the subject of our previously mentioned co-pending patent applications.

After generation of the pulses V1 and V2 the Bragg cell will be switched off so that partially reflected light pulses returning along the optical fibre 14 from splices of an optical fibre sensor will pass through the Bragg cell 7 without deflection to light detecting means 15, such as a photo-detector, conveniently after reflection by a reflecting mirror 16. As before, heterodyne beat frequency signals will be produced and phase modulation can be detected and measured for detecting the impingement of acoustic signals on the optical fibre sensor. In a modified form of the embodiment the linear optical fibre 11 may be dispensed with and one of the light beams from the beam splitter fed directly into the Bragg cell. This modification may involve the introduction of a mirror into the other path including the delay coil.

As will be apparent, use of the Bragg cell as the optical switching means obviates the need for a separate frequency shifting device.

Figure 3:
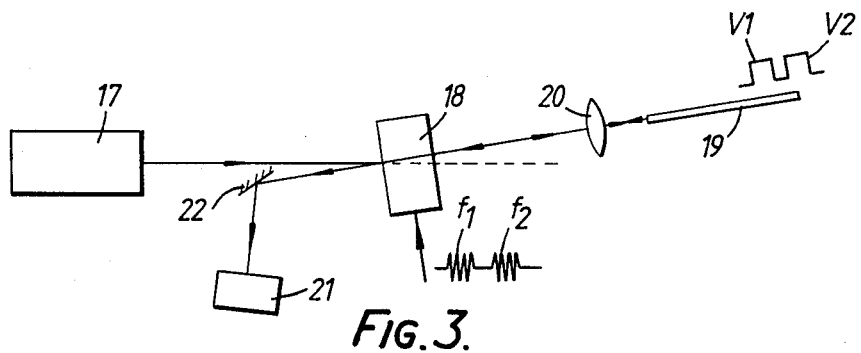

Referring now to FIG. 3 of the drawings, this shows an arrangement suitable for use in a heterodyne interferometer of the kind utilising a relatively long coherent length light source 17 (i.e. gas laser). In this arrangement the continuous wave light output of frequency V derived from the source 17 is fed into a Bragg cell 18. The Bragg cell 18 is driven alternately by signals of frequencies f1 and f2 so that the Bragg cell produces output pulses V1 and V2 displaced from one another by time T, the frequency difference f1−f2 being small enough that both optical pulses are launched into the output fibre. These pulses V1 and V2 are launched into the output optical fibre 19 by means of a convex lens 20. These time displaced pulses may then be used in the sensing of acoustic waves impinging on a spliced optical fibre sensor (not shown) in the manner fully described in our previously mentioned co-pending Patent Application No. 2126820A. After generation of the pulses V1 and V2 the Bragg cell 18 will be switched off so that the partially reflected pulses returning along the fibre 19 will pass through the Bragg cell 18 without being deflected and impinge on light detection means 21 (e.g. photo-diode) after reflection by a mirror 22. Thereafter, the detection of acoustic signals impinging on the spliced optical fibre sensor will be achieved as previously described with reference to FIGS. 1 and 2.

The use of the Bragg cell 18 as an optical switch and frequency shifter enables the relatively "lossy" beam splitter of Patent Application No. 2126820A to be dispensed with and thereby enhances the efficiency of the interferometer arrangement.

I claim:

1. A differential delay optical coherent pulse generating arrangement, in which continuous wave light derived from a coherent light source is divided by beam splitting means into two optical paths, in which the light beam in one of said paths is delayed relative to the light beam in the other of said paths by differential delay means prior to the sequential selection of the light from the respective paths by optical switching means to produce two coherent pulses in predetermined time displaced relationship at an output of the optical switching means when the optical switching means is in two different respective switching positions and in which the optical switching means has a further switching position is which light reflected to the output of the optical switching means will be directed on light detector means.

2. A differential delay optical coherent pulse generating arrangement as claimed in claim 1, in which a frequency difference between the two output pulses is produced by a frequency shifting device introduced into either of the two optical paths, or into the arrangement following the optical switching means in which case the frequency shifting device will be arranged to shift the frequencies of both time displaced pulses relative to one another to produce the requisite frequency differential.

3. A differential delay optical coherent pulse generating arrangement as claimed in claim 1, in which the optical paths are optical fibres.

4. A differential delay optical coherent pulse generating arrangement as claimed in claim 1 or claim 3, in which means is provided for producing a frequency difference between the two coherent pulses.

5. A differential delay optical coherent pulse generating arrangement, in which continuous wave light derived from a coherent light source is divided by beam splitting means into two optical paths, in which the light beam in one of the paths is delayed relative to the light beam in the other of said paths by differential delay means, in which the light beams from the respective optical paths are applied to Bragg cell optical switching means which is driven alternately by two different frequency signals so that time displaced coherent pulses of different frequencies are alternately produced in a common output optical fibre as the Bragg cell is selectively driven or switched by the two different frequency signals and in which the Bragg cell when in its switched off condition following the generation of the time displaced coherent light pulses of different frequencies allows reflected light returning along the optical fibre to be directed on to light detector means without falling on the beam splitting means.

* * * * *